US008093739B2

(12) United States Patent
Gilchrist, III et al.

(10) Patent No.: US 8,093,739 B2
(45) Date of Patent: Jan. 10, 2012

(54) SYSTEM AND METHOD FOR FIXED FREQUENCY POWER GENERATION

(75) Inventors: George Martin Gilchrist, III, Greenville, SC (US); Erik Matthew Ogburn, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 12/351,416

(22) Filed: Jan. 9, 2009

(65) Prior Publication Data

US 2010/0176606 A1    Jul. 15, 2010

(51) Int. Cl.
*F03D 9/00* (2006.01)
(52) U.S. Cl. ............................. 290/44; 290/55
(58) Field of Classification Search .............. 290/52, 290/44, 55
See application file for complete search history.

(56) References Cited

U.S. PATENT DOCUMENTS

| 4,994,684 | A  | 2/1991  | Lauw et al. |
| 6,486,639 | B1 | 11/2002 | Montret et al. |
| 6,768,277 | B2 | 7/2004  | Ichinose et al. |
| 6,856,039 | B2 | 2/2005  | Mikhail et al. |
| 7,948,102 | B2 * | 5/2011 | Schubert et al. ............... 290/44 |

OTHER PUBLICATIONS 1.5 MW Wind Power Station With Low AC-Line Distortion Using a Standard Doubly-Fed Generator System With Field Orientation Control; Eggert, B.; EPE 1997 7th European Conference on Power Electronics and Applications; Trondheim, Sep. 8-10, 1997; Brussels, EPE Association, vol. Conf. 7; Sep. 8, 1997; pp. 2739-2742; XP000792366; ISBN: 978-90-75815-02-3.

Control Strategy of Doubly Fed Induction Generators for a Wind Diesel Energy System; Pena, R., et al., IECON-2002. Proceedings of the 28th Annual Conference of the IEEE Industrial Electronics Society; Sevilla, Spain; Nov. 5-8, 2002, IEEE, New York, NY, US LNKD-DOI:10.1109/IECON.2002.11, vol. Conf. 28, Nov. 5, 2002; pp. 3297-3302, XP010707560; ISBN 978-0-7803-7474-4.

Development of Adjustable Speed Pumping-Generating Units; Osamu, Sugimoto, et al.; Hitachi Review, Hitachi Ltd. Tokyo, JP; vol. 37, No. 6, + Index, Dec. 1, 1988, pp. 439-446; XP000038074; ISSN: 0018-277X.

EP Search Report for Application Serial No. 10150154.2; Mailing Date Jun. 22, 2010.

* cited by examiner

*Primary Examiner* — Tho D Ta
(74) *Attorney, Agent, or Firm* — Cantor Colburn LLP

(57) ABSTRACT

A system for modulating a frequency output of a generator coupled to an electric distribution network is described herein. The system includes: a doubly-fed induction generator coupled to a power source selected from at least one of hydropower and fuel combustion, the generator providing an electrical power output having a first frequency based on a rotational speed of the generator; a controller for selecting the rotational speed of the generator; and a converter coupled to the generator for changing the frequency of the output to a selected value, in response to selecting the rotational speed. Methods for modulating a frequency output of a generator coupled to an electric distribution network are also described.

19 Claims, 3 Drawing Sheets

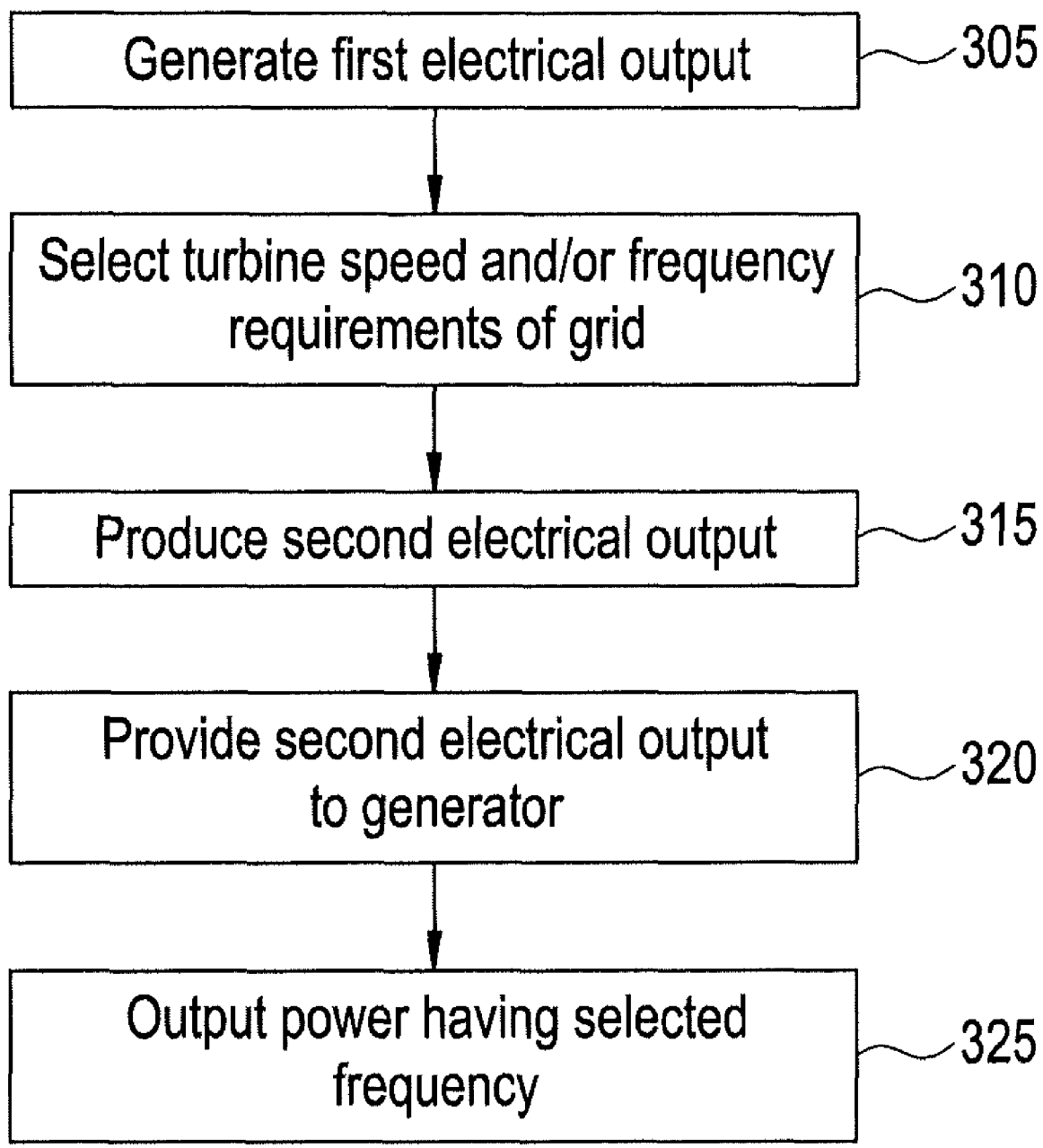

SYSTEM AND METHOD FOR FIXED FREQUENCY POWER GENERATION

BACKGROUND OF THE INVENTION

The teachings herein relate generally to techniques for compensation of changes in power generator speeds.

Power generation systems utilize various sources to generate electrical power, such as hydropower, combustion of fuels such as coal, oil and gas, and wind power. Typically, these sources are harnessed to rotate turbines that are coupled to power generators, which are in turn coupled to various loads via, for example, a power distribution grid (hereinafter referred to as a "grid").

Generation systems utilize power generators that generally produce electrical power that is proportional in frequency to the rotational speed of a turbine. Thus, changes in turbine speeds may result in changes to the power frequency generated. Accordingly, the rotational speed of the turbine should be regulated to produce a frequency that matches the requirements of the grid. In situations where the turbine speed has been changed relative to the required speed, or is not sufficient to produce the required frequency, measures must be taken to modulate the frequency outputted by the generator to match the grid frequency.

A number of the prior art techniques for modulating output include controlling mechanical variables such as fuel flow rate to regulate revolution speed, and various power conversion schemes, which are either slow and/or inefficient.

Techniques for varying turbine power while maintaining desired frequency output have been used, although these techniques generally require the use of multi-shaft configurations, or power converters coupled to the output of the generation system.

Furthermore, doubly fed induction generators have been used in conjunction with wind turbines for reactive power control in response to fluctuations in wind speed. Also, some wind turbine systems use power converters to adjust output to match the grid frequency. However, such reactive techniques do not provide a method for maintaining a selected frequency output during modifications to turbine speed (e.g., to increase efficiency), such as during turbine turn-down or modifications of turbine speed, e.g., in response to power demands.

Accordingly, there is a need for a system and method for modulating power output and frequency for a power generation unit that allows the speed of the power generation unit to be modified without disturbing output power, e.g., to allow turbines in the generation unit to be turned-down or otherwise modified without disrupting the frequency output of the power generation unit.

BRIEF DESCRIPTION OF THE INVENTION

In accordance with one aspect, the present invention provides a system for modulating a frequency output of a generator coupled to an electric distribution network. The system includes: a doubly-fed induction generator coupled to a power source selected from at least one of hydropower and fuel combustion, the generator providing an electrical power output having a first frequency based on a rotational speed of the generator; a controller for selecting the rotational speed of the generator; and a converter coupled to the generator for changing the frequency of the output to a selected value, in response to selecting the rotational speed.

In accordance with another aspect, the present invention provides a method for modulating a frequency output of a generator coupled to an electric distribution network. The method includes: generating a first electrical output from a doubly fed induction generator, the first electrical output having a first frequency based on a rotational speed of the generator; selecting at least one of i) the rotational speed of the generator and ii) a network frequency requirement; producing a second electrical output having a second frequency; and providing the second electrical output to the generator to modify the first frequency.

In accordance with another aspect, the present invention provides a method for modulating a frequency output of a generator coupled to an electric distribution network. The method includes: monitoring an electrical output frequency from the generator; comparing the electrical output frequency to a network frequency requirement; modifying at least one of i) a rotational speed of the generator and ii) the network frequency requirement; and adjusting the electrical output frequency to conform to the network frequency requirement.

It should be appreciated that the present invention provides systems and methods for controlling the frequency of electrical power generators that allow for the speed of a prime mover such as a turbine to be modified without disruptions to the frequency of power outputted from a power generator. The systems and methods allow for generators and/or prime movers to be used in conjunction with loads and/or networks having varying frequency requirements. In any event, additional objects, features and advantages of the various aspects of the present invention will become more readily apparent from the following detailed description when taken in conjunction with the drawings wherein like reference numerals refer to corresponding parts in the several views.

The above described and other features are exemplified by the following detailed description and appended claims.

BRIEF DESCRIPTION OF THE DRAWINGS

Referring now to the drawings wherein like elements are numbered alike in the several Figures, wherein:

FIG. 3 is a flow chart depicting an exemplary process for frequency modulation.

DETAILED DESCRIPTION OF THE INVENTION

Figure 1:
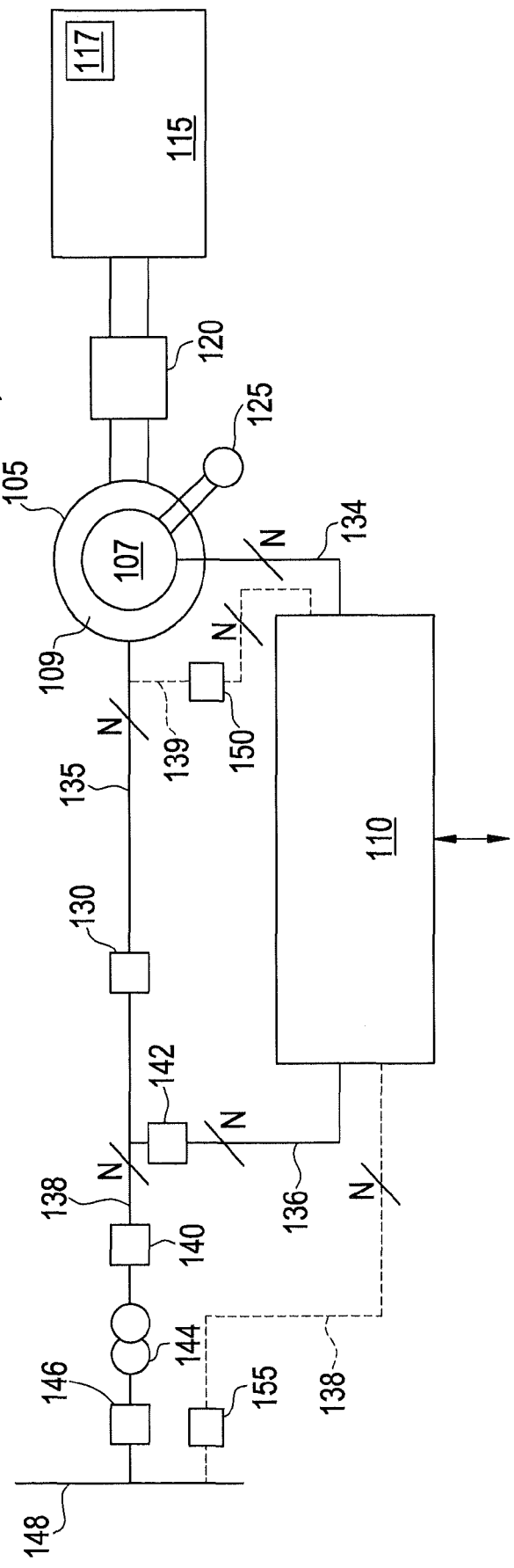
FIG. 1 depicts aspects of an embodiment of a system for electric power generation.

Various embodiments of systems and methods for controlling power frequency in an electrical generation system are described herein. In one embodiment, a power generation system is provided for connection to one or more electric loads via, for example, an electric power distribution network. The power generation system includes at least one device for generating mechanical power, referred to herein as a "prime mover", connected to one or more doubly-fed induction generators whose output is synchronized to the grid and whose excitation comes from a frequency and/or power converter. The frequency and/or power converter (hereafter referred to as a "frequency/power converter") may receive power from the output of the generator (e.g., from a stator in the generator), and change the frequency of this output to a value required by the generator field to obtain an output at the desired frequency.

In one embodiment, as described herein, the term "prime mover" refers to a device that produces mechanical energy from a power source, such as a hydroelectric and/or fuel combustion power source. The prime mover may include, for example, at least one of a reciprocating power engine and a rotating power engine. An example of a rotating engine is a turbine, and an example of a reciprocating engine is a gas-fuel reciprocating engine that may be powered by a variety of gases such as natural gas. In one example, the prime mover may include a hydroelectric turbine, a gas turbine, a steam turbine, or any combination thereof. In another example, the prime mover may include at least one gas turbine coupled with at least one steam turbine, or at least one gas turbine coupled with a clutch that is in turn coupled with at least one steam turbine. Any number and combination of the above engines and devices may be used as a prime mover. The number and types of prime movers and turbines are not limited to the exemplary engines described herein. Any other suitable devices known now or in the future may be used.

In some embodiments, the prime mover, in the form of the hydroelectric or fuel combustion engine, rotates at a fixed speed that is defined by the electrical frequency of the electric grid. The systems and methods described herein allow the prime mover rotational speed to be selected or modified, e.g., in response to fluctuating power demands, while maintaining power output at a frequency required by the grid, i.e., a network frequency requirement.

The systems and methods described herein maintain a constant output frequency despite fluctuation of prime mover speed. In a gas turbine generation system, for example, operation may be optimized or otherwise improved by allowing the turbine speed to be selected or modified base on power demand to increase efficiency, and by maintaining constant frequency output despite changes in various conditions, such as such as ambient temperature, fuel content and others. In other embodiments, the systems and methods may be applied for power control in response to fluctuations in turbine speed.

In still other embodiments, the systems and methods may be used as modular systems, and may be coupled to various grids and accommodate various frequency requirements. The prime mover in this case may be designed for a base frequency operation that is different than the frequency or frequencies defined in the network frequency requirement, and the excitation of the doubly fed induction generator could accommodate this design differential and allow for use of the design. In other embodiments, the systems may be configured to facilitate start-up of the prime mover.

With initial reference to FIG. 1, an exemplary power generation system is generally indicated at 100. The power generation apparatus 100 includes a generator 105 and a frequency/power converter 110. A prime mover 115 is coupled to an optional gear box 120, which is, in turn, coupled to the generator 105.

In one embodiment, the prime mover 115 includes one or more hydroelectric and/or fuel combustion engines. For example, the prime mover 115 may include one or more reciprocating engines and/or one or more rotating engines. In one example, the prime mover 115 may include a hydroelectric turbine, a gas turbine, a steam turbine, or any combination thereof In another example, the prime mover 115 may include at least one gas turbine coupled with at least one steam turbine, or at least one gas turbine coupled with a clutch that is in turn coupled with at least one steam turbine. A controller 117 may also be coupled to the prime mover 115 to allow for the prime mover 115 rotational speed to be modified from, e.g., a full running speed, or otherwise selected based on various conditions.

In this embodiment, the generator 105 is a doubly fed induction generator 105 (also known in the art as a "wound rotor"). The generator 105 includes a rotor 107 and a stator 109. A tachometer 125 may be coupled to the generator 105 to provide for monitoring of the speed of the generator 105.

The doubly fed induction generator 105 is connected to a grid and is fed by the power/frequency converter 110. The power/frequency converter 110 is capable of outputting various frequencies (ranging from zero frequency, i.e., direct current, to any desired frequency) to the rotor 107 of the induction generator 105. In some embodiments, the range of frequencies may be limited to certain ranges due to the capabilities of the induction generator 105.

In one embodiment, the generator 105 may be coupled to a stator-synchronizing switch 130 via a stator bus 135 and may also be coupled to the power/frequency converter 110 via a rotor bus 134. The stator-synchronizing switch 130 may be connected to a system circuit breaker 140 via a system bus 138. It should be noted that when reference is made herein to a "bus," this refers to any communication or transmission link that includes one or more conductors or lines that define or form an electrical, communication or other type of path.

In some embodiments, the power/frequency converter 110 may be coupled to a converter circuit breaker 142 via a line bus 136. The converter circuit breaker 142 may also be coupled to the system circuit breaker 140 via the system bus 138. It should be noted that the output lines of the converter circuit breaker 142 and the lines of the system bus 138 may be coupled in any manner known now or in the future, including by wiring corresponding lines together (e.g., corresponding power phase lines) using a current summation technique. The buses described herein may transmit power in any number of phases ("N" phases) from the stator 109 and rotor bus 134 provides output of "N" phases from the rotor 107.

The system circuit breaker 140 may be coupled to a transformer 144, which may be connected to a grid breaker 146. The grid breaker 146 may be connected to the grid via a grid bus 148. The system 100 may further include various breakers, switches, and other devices to allow the system 100 to function as desired.

The circuit breakers within the system 100, including the converter circuit breaker 142, system circuit breaker 140 and grid breaker 146 are configured to disconnect corresponding buses, for example, when current flow is excessive and can damage the components of the system 100. In one embodiment, the apparatus 100 includes a power converter startup circuit breaker 150 and a grid startup circuit breaker 155, which are configured to disconnect corresponding buses, such as a grid start-up bus 138 and a power converter start-up bus 139, in the event of excessive power flow.

Figure 2:
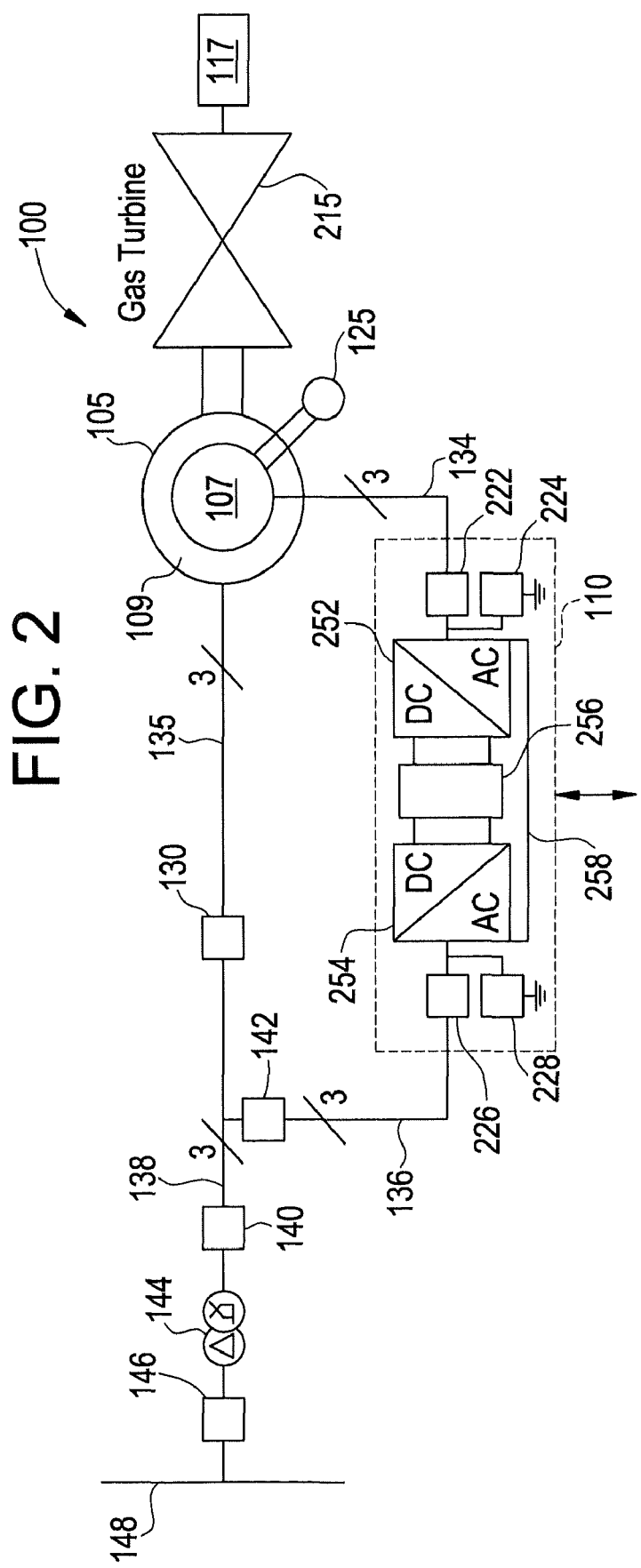
FIG. 2 depicts aspects of another embodiment of the system of FIG. 1.

Referring to FIG. 2, another embodiment of the exemplary power generation system 100 is shown. In this embodiment, the system 100 includes a gas turbine 215 as the prime mover, the doubly fed induction generator 105, and the frequency/power converter 110.

The electric grid in this embodiment includes an electric signal that is a three-phase electric signal, as indicated by the numeral "3" shown with the stator bus 135, the rotor bus 134, the line bus 136 and the system bus 138. However, it should be recognized that discussion of a three-phase input signal is for convenience and illustration purposes only, and not limiting of the teachings herein. For example, the teachings herein may be applied to single-phase signals and other multi-phase or poly-phase signals.

The frequency/power converter 110 is shown in more detail in FIG. 2. In this embodiment, the generator 105 is coupled to a rotor side series filter 222 and/or a rotor side parallel filter 224 via the rotor bus 134. The rotor side series filter 222 and/or the rotor side parallel filter 224 are coupled to a rotor side converter 252. The rotor side converter 252 is coupled to a line side converter 254, which is also coupled to a line side series filter 226 and/or a line side parallel filter 228.

The rotor side converter 252 and the line side converter 254 are coupled via a DC link 256. In exemplary embodiments, the rotor side converter 252 and the line side converter 254 are configured for a normal operating mode in a three-phase, Pulse Width Modulation (PWM) configuration.

The frequency/power converter 110 may also include a controller 258 to control the operation of the rotor side converter 252 and the line side converter 254. In one embodiment, the controller 258 and/or the prime mover controller 117 may be used to monitor the electrical output frequency from the generator 105. In various embodiments, the frequency/power converter 110 receives control signals from, for example, a control system via the controller 258, for control of the operation of the frequency/power converter 110. The control signals are based, among other things, on sensed conditions or operating characteristics of the system 100 as described herein. For example, the control inputs and outputs may be based on, without limitation, information from the prime mover controller 117, inputs and outputs from the prime mover, external information from remote locations, power grid information, conditions and characteristics, and information from a power plant controller. For example, feedback from the tachometer 125 in the form of sensed speed of the generator 105 may be used to control the conversion of the output power from the stator 109 to maintain a proper and balanced power supply. In one embodiment, the controller 258 may also be coupled to the gas turbine 215 to allow the rotational speed of the gas turbine 215 to be selected and modified as needed.

Although the systems described herein related to frequency/power converters, other types of devices known now or in the future sufficient to modify the output frequency may be used. For example, a Matrix converter may be used or an independent source for the induction motor excitation (besides feeding the motor from the output). Other prime movers not specified above could also be included.

In operation, magnetic fields rotating through the stator 109 produce current in windings (not shown) in the stator 109. This current is output from the generator 105 to the grid. The current and voltage produced by the generator 105 is proportional in frequency to the rotational speed of the rotor 107 and the prime mover 115.

The system 100 works by synchronizing the generator 105 to the grid, i.e., conforming to a grid or network frequency requirement. In some instances, the generator 105 is synchronized to the grid and will output a voltage and current at the grid frequency. However, this requires the gas turbine 215 to also maintain its speed at the grid frequency. In instances where the gas turbine 215 speed is not at the grid frequency, the system 100 compensates by feeding excitation power to the generator 105 at a frequency that is required by the generator field to output power having a frequency that is synchronized to the grid.

In one embodiment, the stator bus 135, the line bus 136 and the rotor bus 134 form an excitation circuit through which the generator 105 can be excited and/or the frequency/power converter 110 can be powered. Current may be provided from the grid and/or the stator 109 to the rotor 107 via the excitation circuit. If the current provided is DC current, the output of the stator 109 will be at a frequency proportional to the rotational speed of the gas turbine 215. If the current provided to the rotor 107 has a frequency other than zero (DC), the frequency of the power output from the stator 109 may be modified relative to the output frequency based on a fed DC current. In this way, for example, the output frequency from the stator 109 may be maintained at the required frequency of the grid (i.e., the "rated" frequency). Thus, by feeding the rotor 107 of the generator 105 with a given frequency of current rather than DC, it appears to the generator 105 that the rotor 107 and the gas turbine 215 are rotating at rated speed when in reality they are not.

The excitation circuit may also be used to provide power to the frequency/power converter 110. In one embodiment, power is provided from the stator 109 via the line bus 136. On the line bus 136 side, alternating current (AC) power is converted to direct current (DC) power by the line side converter 254. This DC current is then fed via the DC link 256 to the rotor side converter 252, and is converted to AC current having the desired frequency. This desired frequency current is fed to the rotor 107, which causes the frequency of the output from the stator 109 to change accordingly. The frequency output from the frequency/power converter 110 may be adjusted as desired to produce a corresponding stator 109 output frequency.

The frequency/power converter 110 may also be used for start-up purposes. In this embodiment, the generator 105 components may be sized accordingly to be capable of operating as either a start-up means (using the generator 105 as a motor) or as a rotor 107 frequency modulator.

For example, the generator 105 may be used to start the gas turbine 215 by driving the generator 105 as a motor to accelerate the gas turbine 215 to a required start-up speed, after which turbine speeds may be maintained using the appropriate fuel (e.g., gas and hydropower).

To start the gas turbine 215, the frequency/power converter 110 may receive power from the grid via the grid startup bus 138. The converters 252 and 254 may be used to provide the voltage requirements to the generator 105, which is driven as a motor for starting the gas turbine 215 and accelerating the gas turbine 215 to start-up speed. In other embodiments, the frequency/power converter 110 may receive power from any desired source in addition to the grid, such as a separate excitation generator. The controller 258 may be used to control the changes in frequency and voltage needed during the start-up phase to accelerate the gas turbine 215, or a turbine controller (not shown) or any other control device may be used.

FIG. 3 illustrates a method 300 for automatic modulation of power frequency output from an electric power generator, which includes one or more stages 305-325, and which may be performed by execution of a control application associated with a power generator. The method may be performed in conjunction with, for example, the power generator system 100 described above. Although the method 300 is described in conjunction with the gas turbine 215 and the frequency/power converter 110, the method 300 may be used with any suitable type of prime mover and/or any suitable device for converting the frequency of electric power.

In stage 305, a first electrical output is generated from the generator 105. This output may be from the stator 109 as a result of the rotation of the rotor 107, which corresponds to the rotation of the gas turbine 215. The first output has a first frequency that is based on a rotational speed of the generator 105, which may be defined by rotor 107.

In some embodiments, the first electrical output of the generator 105 is monitored, e.g., continuously or periodically, and may also be compared to the frequency required by a network frequency requirement. In one embodiment, "network frequency requirement" refers to the frequency required by the network (such as the grid and/or one or more loads) of any electrical power supplied to the network. The network frequency requirement may be a single frequency, multiple frequencies or a range of frequencies. Such monitoring and comparison may be performed, for example, by a controller coupled to the generator 105, or may be performed by any other controllers or computing devices, such as the controller 258.

In stage 310, the rotational speed of the gas turbine 215 is selected (e.g., modified from an operating speed), and/or a network frequency requirement is selected or modified. As used herein, the term "operating speed" refers to a rotational speed of the gas turbine 215 that corresponds to a desired stator 109 output frequency, such as the frequency required by a grid.

In one embodiment, selecting or modifying the network frequency requirement may include changing the coupling of the gas turbine 215 from a first network having a first network frequency requirement to a second network having a second different network frequency requirement.

Selection of the rotational speed may occur due to any number of reasons.

In one embodiment, the rotational speed may be selected or modified to increase or optimize the efficiency of the system 100. For example, an issue facing power generation is the loss of efficiency during prime mover turn-down under certain configurations. In certain instances, for example when power demand is low, it is desirable to "turn down" the gas turbine 215, i.e., reduce the rotational speed of the gas turbine 215.

The output of the frequency/power converter 110 may be varied based on desired gas turbine 215 speed, so that the gas turbine 215 can be turned down, the frequency from the frequency/power converter 110 can be ramped up, and the overall frequency output of the generator 105 can be maintained at the same level, with a reduction in the power output as required by the grid. This would be applicable to times when less power is required (such as night). When the grid again requires full output, the gas turbine 215 can be ramped (i.e., the rotational speed increased) to rated speed to output maximum power as necessary and the frequency converter can be reduced to a DC output.

In another embodiment, changes in various conditions may cause a change in the rotational speed. Examples of such conditions include changes in ambient temperature, changes in fuel content, and others.

In stage 315, the frequency/power converter 110 produces a second electrical output having a second frequency. This frequency should be of a value sufficient to cause the generator 105 to produce a selected output frequency. In one embodiment, the selected frequency is a frequency having a value that conforms to the network frequency requirement. In one embodiment, the frequency/power converter 110 receives at least a portion of the first electrical output, and changes the frequency of the first electrical output to the second frequency. In one embodiment of stage 315, the frequency/power converter 110 receives at least a portion of the first electrical output from the stator 109, changes the frequency via converters 252 and 254, and thus produces the second electrical output having the second frequency.

In stage 320, the frequency/power converter 110 provides the second electrical output to the generator 105 to adjust the first frequency. In one embodiment, the frequency/power converter 110 produces the second electrical output in the form of an excitation current having the second frequency, and inputs the excitation current to the rotor 107.

In stage 325, the generator 110 outputs power to the grid with the selected frequency. In one embodiment, in response to the excitation current being inputted to the rotor 107, the stator 109 outputs power having the selected output frequency. In one embodiment, the selected output frequency is a frequency that conforms to the network frequency requirement.

In one embodiment, the method 300 is provided to conform the gas turbine 215 for operation with a network having a different base frequency operation or network frequency requirement. In this embodiment, stages 310-325 may be performed to excite the rotor 107 and thereby cause the stator to output a frequency that conforms to the network frequency requirement. In this way, the method 300, and the system 100, may be used to accommodate this network to allow for use of the gas turbine 215 in a variety of networks and for a variety of loads.

A number of advantages, and technical contributions accrue from the above-disclosed embodiments, some of which are discussed below. The systems and methods described herein allow the operation of the prime mover 115 to be optimized based on the ability to turn down while maintaining the grid frequency. For example, during periods of low power demand (e.g., nighttime), the prime mover 115 may be turned down (or enter a turndown mode) when peak power is not required. In addition, in overspeed conditions, power can be taken from the rotor as well as the stator to maintain the output at the desired frequency. The prime mover 115 may thus be turned down or otherwise adjusted based on various conditions such as power demand and optimized given these conditions without the use of additional components or devices, such as a power converter coupled to the output or a multi-shaft configuration. The systems and method described herein thus help to optimize generation systems to allow for efficient turn down or any other desired set of conditions.

Another advantage of the systems and methods described herein is the ability to use the generator 105 and/or the prime mover 115 with electric grids operating at different frequencies. Thus, a turbine designed for a given frequency output can be used on grid operating at a different frequency using the systems described herein.

One skilled in the art will recognize that techniques for frequency modulation 300 may be deployed in a variety of ways. For example, current frequency modulation 300 may be governed by operation of software or firmware. In one example, the software and firmware are implemented in the controller 258 and/or the prime mover controller 117 to provide for rapid adjustment of the power generation system 100. However, this is merely illustrative and not limiting of the embodiments disclosed herein.

The methods and systems described above and/or claimed herein pertain to any computer system having any number of memory or storage units, and any number of applications and processes occurring across any number of storage units or volumes, which may be used in connection with the methods and systems described above and/or claimed herein. Thus, the same may apply to an environment with server computers and client computers deployed in a network environment or distributed computing environment, having remote or local storage. The methods and systems described above and/or claimed herein may also be applied to standalone computing devices, having programming language functionality, interpretation and execution capabilities for generating, receiving and transmitting information in connection with remote or local services.

The methods and systems described above and/or claimed herein is operational with numerous other general purpose or special purpose computing system environments or configurations. Examples of well known computing systems, environments, and/or configurations that may be suitable for use with the methods and systems described above and/or claimed herein include, but are not limited to, personal computers, server computers, substation controllers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and systems described above and/or claimed herein may also be practiced in distributed computing environments such as between different power plants or different power networks where tasks are performed by remote processing devices that are linked through a communications network or other data transmission medium. In a typical distributed computing environment, program modules and routines or data may be located in both local and remote computer storage media including memory storage devices. These resources and services may include the exchange of information, cache storage, and disk storage for files. In this regard, a variety of devices may have applications, objects or resources that may utilize the methods and systems described above and/or claimed herein.

Computer programs implementing the methods described may be stored in a portable storage medium such as a CD-ROM. The program could be copied to a hard disk or a similar intermediate storage medium in the controller or in a computer. When the programs are to be run, they will be loaded either from their distribution medium or their intermediate storage medium into the execution memory of the computer or processor, thus configuring a computer to act in accordance with the methods and systems described above.

Thus, the various techniques described herein may be implemented in connection with hardware or software or, where appropriate, with a combination of both. Thus, the methods and systems described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and systems of described above and/or claimed herein. In the case of program code execution on programmable computers, the computing device will generally include a processor, a storage medium readable by the processor which may include volatile and non-volatile memory and/or storage elements, at least one input device, and at least one output device. One or more programs that may utilize the techniques of the methods and systems described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and systems described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and systems of described above and/or claimed herein. Further, any storage techniques used in connection with the methods and systems described above and/or claimed herein may invariably be a combination of hardware and software.

While the methods and systems described above and/or claimed herein are described above with reference to an exemplary embodiment, it will be understood by those skilled in the art that various changes may be made and equivalence may be substituted for elements thereof without departing from the scope of the methods and systems described above and/or claimed herein. In addition, many modifications may be made to the teachings of above to adapt to a particular situation without departing from the scope thereof. Therefore, it is intended that the methods and systems described above and/or claimed herein not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

The invention claimed is:

1. A system for modulating a generator coupled to an electric distribution network, the system comprising:
   a doubly-fed induction generator coupled to a device for generating mechanical power from a power source selected from at least one of hydropower and fuel combustion, the generator providing an electrical power output having a first frequency based on a rotational speed of the generator;
   a controller for selecting one or more rotational speeds of the generator needed for starting operation the device; and
   a converter coupled to the generator for controlling the rotational speed of the generator to start the device, in response to the controller selecting the one or more rotational speeds.

2. The system of claim 1, wherein the device is a turbine, and starting operation of the device includes accelerating the turbine to a required start-up speed.

3. The system of claim 1, wherein the device is selected from at least one of a rotating engine and a reciprocating engine.

4. The system of claim 1, wherein the converter is configured to control the first frequency of the output to a selected value that conforms to a network frequency requirement.

5. The system of claim 4, wherein the converter provides excitation to the generator, the excitation having a second frequency sufficient to adjust the first frequency to the selected value.

6. The system of claim 1, wherein the doubly-fed induction generator comprises a stator and a rotor.

7. The system of claim 6, wherein the stator is coupled to the network, and the rotor is coupled to the converter and the device.

8. The system of claim 4, wherein the converter receives at least a portion of the electrical power output, converts the first frequency of the power output to produce an excitation output, and provides the excitation output to the generator to adjust the first frequency to the selected value.

9. A method for modulating a generator coupled to an electric distribution network, the method comprising:
- generating an excitation signal from a converter to a doubly fed induction generator, the generator configured to generate a first electrical output having a first frequency based on a rotational speed of the generator, the generator coupled to a device for generating mechanical power from a power source;
- selecting one or more rotational speeds of the generator needed for starting operation of the device; and
- controlling the rotational speed of the generator to start the device, using the excitation signal, in response to selecting the one or more rotational speeds.

10. The method of claim 9, further comprising:
- selecting at least one of i) the rotational speed of the generator and ii) a network frequency requirement;
- producing a second electrical output having a second frequency; and
- providing the second electrical output to the generator to modify the first frequency.

11. The method of claim 10, wherein selecting at least one of i) the rotational speed of the generator and ii) the network frequency requirement comprises at least one of i) reducing the rotational speed and ii) increasing the rotational speed, based on a power demand on the electric distribution network.

12. The method of claim 9, wherein the device is a turbine, and starting operation of the device includes accelerating the turbine to a required start-up speed.

13. The method of claim 10, wherein producing the second electrical output comprises converting at least a portion of the first electrical output to the second frequency.

14. The method of claim 10, wherein producing the second electrical output comprises inputting at least a portion of the first electrical output into the converter coupled to the generator, and changing the frequency of the first electrical output to the second frequency.

15. The method of claim 10, wherein producing the second electrical output comprises converting at least a portion of the first electrical output to a direct current by a first converter, inputting the direct current to a second converter, and converting the direct current to the second frequency by the second converter.

16. The method of claim 10, wherein the first frequency is modified to a frequency that conforms to the network frequency requirement.

17. The method of claim 10, wherein the doubly fed induction generator comprises a stator coupled to the network and a rotor coupled to the converter.

18. The method of claim 17, wherein providing the second electrical output comprises inputting the second electrical output to the rotor and outputting an adjusted electrical output from the stator, the adjusted electrical output having a selected frequency based on the second frequency and the rotational speed of the device.

19. The method of claim 9, further comprising:
- monitoring the first frequency of the first electrical output from the generator;
- comparing the first frequency to a network frequency requirement;
- modifying at least one of i) the rotational speed of the generator and ii) the network frequency requirement; and
- adjusting the first frequency to conform to the network frequency requirement.

* * * * *